(12) United States Patent
Clark et al.

(10) Patent No.: US 7,441,783 B2
(45) Date of Patent: Oct. 28, 2008

(54) UTILITY CART

(75) Inventors: Jack G. Clark, Katy, TX (US); Royal Frederich Monteith, Houston, TX (US)

(73) Assignee: EZ Does It Cart, Inc., Katy, TX (US)

( * ) Notice: Subject to any disclaimer, the term of this patent is extended or adjusted under 35 U.S.C. 154(b) by 281 days.

(21) Appl. No.: 11/084,970

(22) Filed: Mar. 21, 2005

(65) Prior Publication Data

US 2006/0208440 A1 Sep. 21, 2006

(51) Int. Cl.
*B62B 3/02* (2006.01)

(52) U.S. Cl. .............................. 280/35; 280/30; 280/659

(58) Field of Classification Search ................... 280/35, 280/638, 651, 659, 87.01, 79.3, 30, 33.998; 180/79.11
See application file for complete search history.

(56) References Cited

U.S. PATENT DOCUMENTS

| | | | |
|---|---|---|---|
| 2,604,334 A * | 7/1952 | Schultz ..................... 280/47.35 |
| 2,718,404 A | 9/1955 | Burskey |
| 3,220,773 A | 11/1965 | Burns |
| 3,372,829 A | 3/1968 | Averill |
| 4,165,088 A * | 8/1979 | Nelson ..................... 280/47.35 |
| 4,512,591 A | 4/1985 | Plante |
| 4,620,637 A | 11/1986 | Karashima |
| 4,635,956 A | 1/1987 | Morrissette |
| 4,744,575 A * | 5/1988 | Tonelli ..................... 280/87.01 |
| 4,796,909 A | 1/1989 | Kirkendall |
| 4,887,836 A * | 12/1989 | Simjian ..................... 280/651 |
| 5,186,479 A | 2/1993 | Flowers |
| 5,249,823 A | 10/1993 | McCoy et al. |
| 5,280,933 A | 1/1994 | Finneyfrock |
| 5,299,817 A * | 4/1994 | Chang ..................... 280/35 |
| 5,299,826 A | 4/1994 | Flowers |
| D348,132 S | 6/1994 | McCoy et al. |
| 5,529,323 A | 6/1996 | Braucke |
| 5,599,031 A * | 2/1997 | Hodges ..................... 280/79.11 |
| 5,695,205 A | 12/1997 | Liu |
| 5,816,604 A | 10/1998 | Hsieh |
| 5,857,695 A * | 1/1999 | Crowell ..................... 280/651 |
| 6,109,644 A | 8/2000 | Cox |
| 6,213,482 B1 | 4/2001 | Yemini |
| 6,325,395 B1 | 12/2001 | Frymoyer |

* cited by examiner

Primary Examiner—Frank B Vanaman
(74) Attorney, Agent, or Firm—John C. McMahon

(57) ABSTRACT

An easily adjustable cart for transporting loads short distances having a moving bed that is moveable from between upper and lower levels and is mounted on a telescoping frame. The frame extends longitudinally to allow a user to install front and rear trestles in order to raise the bed from the lower level to the upper level and alter the configuration of the cart in order to accommodate loads of varying shapes and sizes. The frame includes a lower support for a handle that prevents bowing when the frame is subjected to heavy loads.

7 Claims, 6 Drawing Sheets

UTILITY CART

BACKGROUND OF THE INVENTION

The present invention is directed to a utility cart for transporting loads of various shapes and sizes having a telescoping frame and elevating bed for accommodating said loads.

Carts for transporting loads have existed for some time and are available in many different shapes and sizes with varying functions depending on a user's intended purpose. Until recently, carts were designed of a fixed size and could therefore only accommodate loads of a corresponding fixed size. It has been found to be beneficial to design carts that are modifiable and capable of assuming various shapes and sizes in order to accommodate various loads. Such variable-use cart designs include those having telescoping frames that can be adjusted to assume various configurations in order to accommodate the desired application. Specifically, it is desirable that such carts be equipped with working surfaces or containers that can be set at multiple levels or removed altogether. Although certain variable-use carts are known within the art, prior-art designs have varying degrees of awkwardness and are otherwise not user friendly requiring the user to undergo unnecessarily complicated maneuvers to convert the cart to a desired configuration. Thus, to facilitate the ease of conversion process, there is a demand to provide cart designs that render the process of converting a variable-use cart between different configurations more efficient and user friendly.

SUMMARY OF THE INVENTION

The present invention provides an improved easily adjustable utility cart for transporting loads having a telescoping frame, a generally horizontal bed that is moveable between lower and upper levels and two selectively installable trestles for raising said bed from the lower level to the upper level to accommodate various loads that can be transporting in the bed or directly on the frame. A flat platform can be placed directly on the frame and used with the bed in the raised position or without the bed. The trestles have bottom and top projections and are installed by mating the bottom projections with receivers located in the frame while the top projections mate with receivers located in the bed or the bed can be left uninstalled altogether to provide an additional configuration for additional uses. The present design also includes a support bar located on the frame that prevents the bowing of the frame under heavy loads.

OBJECTS AND ADVANTAGES OF THE INVENTION

Therefore, the objects of the present invention include: providing an improved garden or utility cart for transporting loads with a load-carrying bed that can be moved between a lower level or that is raisable to an upper level; providing such a cart having a support mechanism to prevent bowing of the frame and/or pivot assembly under heavy loads; providing such a cart that has telescoping frame members in order to accommodate loads of varying shapes and sizes; providing such a cart that is easily and quickly modified to various sizes; providing such a cart that has a relatively small profile for storage and carrying; providing such a cart having telescoping elongate members that are capable of directly supporting a load yet simultaneously maintaining structural weight at a minimum; providing such a cart that is constructed of lightweight materials; providing such a cart having sufficiently wide wheels such that said cart can easily travel over mud, soft ground and sand; providing such a cart that can be easily constructed and modified; and providing such a cart which is economical to manufacture, which is compact and secure in use, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 8:
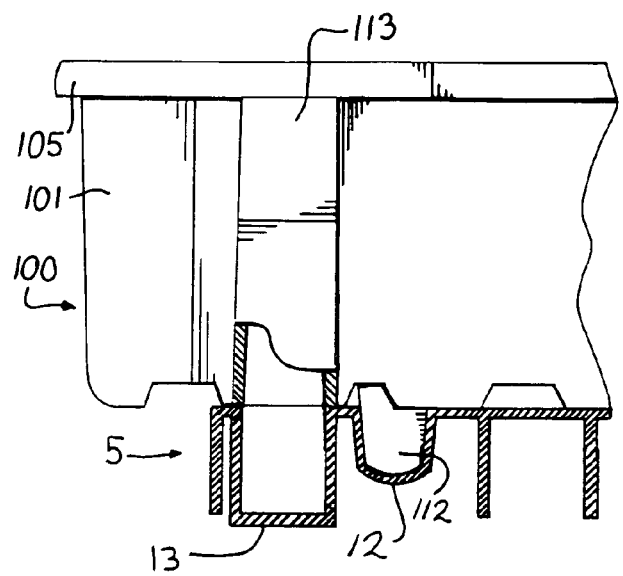
FIG. 8 is an enlarged and fragmentary side elevational view of the cart illustrating the bed mounted on the frame via a projection located in a receiver, with portions broken away to show detail thereof.
Figure 9:
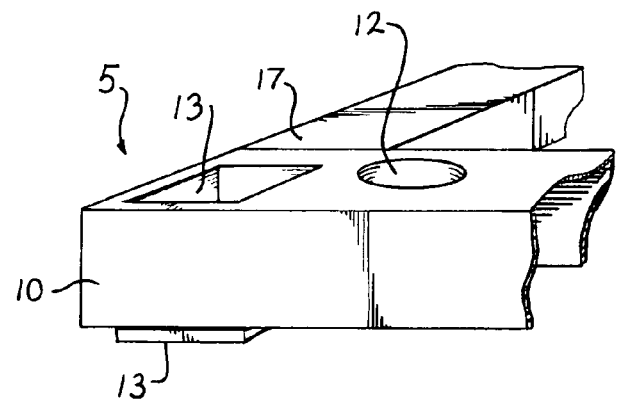
FIG. 9 is an enlarged and fragmentary perspective view of the cart illustrating the frame having with two different projection receivers for allowing selective mounting of the bed or alternatively the trestles directly on the frame.
Figure 10:
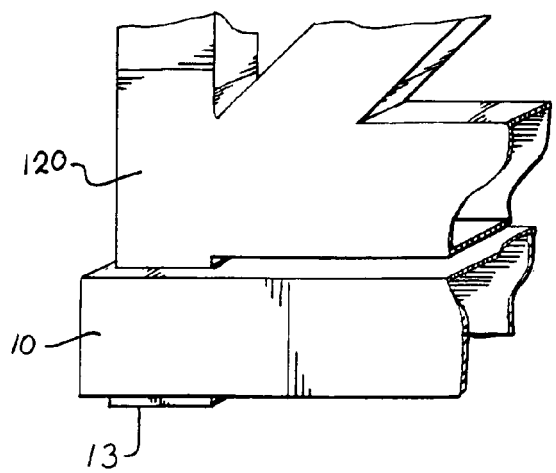
FIG. 10 is an enlarged and fragmentary perspective view of the cart illustrating the frame with the trestles mounted on the frame via a trestle projection mounted in the trestle receivers.

Referring to the drawings in more detail, the reference numeral 1 generally designates a garden or utility cart that is easily adjusted to various use configurations and which embodies the present invention. The cart 1 generally includes a frame 5 with front and rear members or structural units 10 and 11 each having a set of spaced round bores or receivers 12 and a set of two square openings or receivers 13 located on either side of the front and rear members 10 and 11. Examples of the receivers, including receivers 12 and 13 are depicted in FIGS. 8 and 9. The purpose of the receivers 12 and 13 will be discussed further below.

The front and rear members 10 and 11 are connected by telescoping side lateral members 17 having first and second sections 18 and 19 with the first section 18 being sized and shaped with a smaller outer dimension relative to the second section 19 so that the first section 18 can be inserted into and slid along the second section 19. Also connecting the front and rear members 10 and 11 is a telescoping central lateral member 24 having first and second sections 25 and 26. The central first and second sections 25 and 26 operate in much the same way as the sections 18 and 19 except that the first section 25 is sized and shaped with a larger inner dimension in order to fit around the relatively smaller second section 26.

Figure 11:
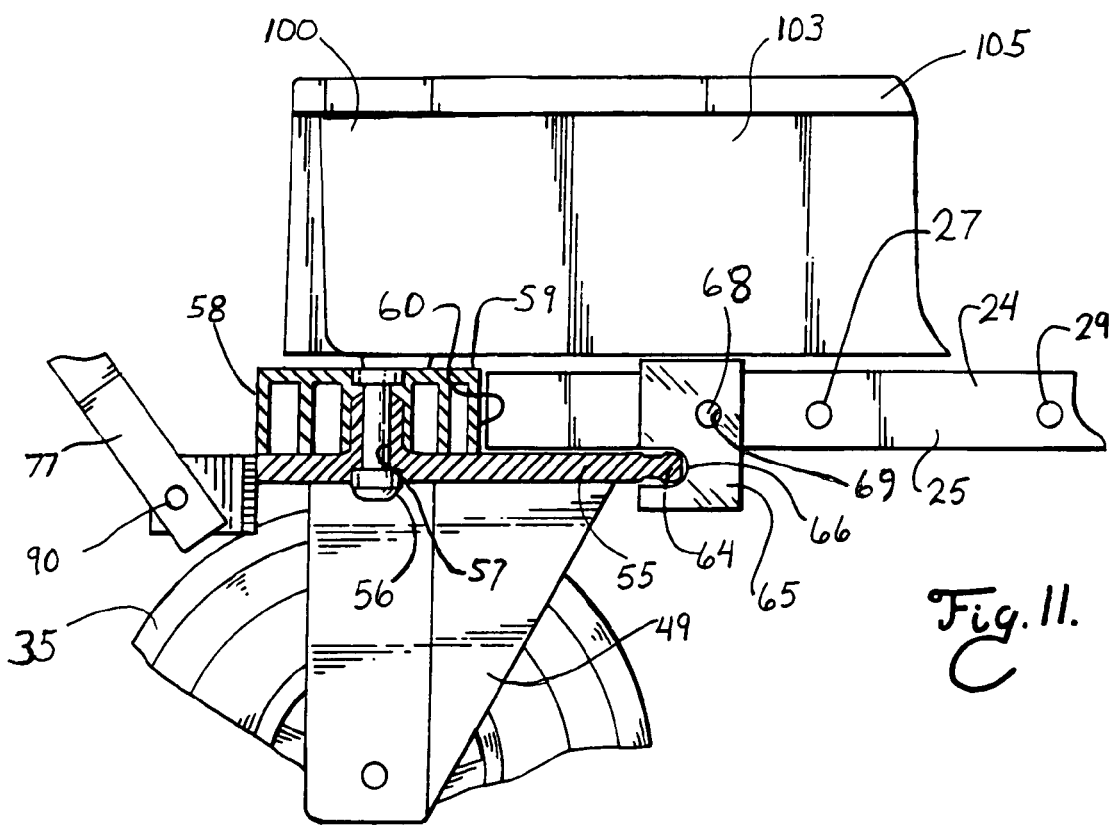
FIG. 11 is an enlarged and fragmentary and partially cross-sectional view, wherein the cross section is taken along line 11-11 of FIG. 3, and illustrating the support flange secured to a central member of the frame and supporting the pivot plate.
Figure 7:
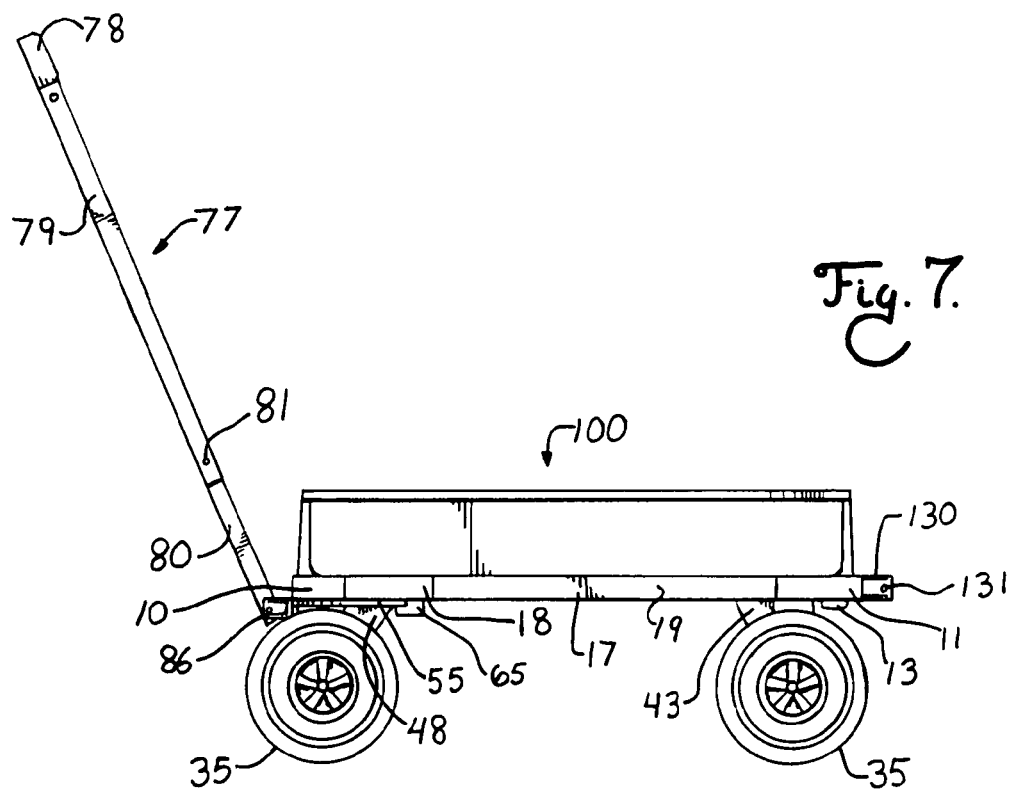
FIG. 7 is a side elevational view of the cart on a reduced scale and is similar to FIG. 6, except that the trestles are removed, thus illustrating the bed in a lowered position mounted directly onto the frame.

The telescoping members 17 and 24 allow a user to selectively extend and distance the front and rear members 10 and 11 away from each other in order to utilize the cart 1 with loads of varying shapes and sizes and to adjust for positioning of various elements of the cart 1 on the frame 5, as discussed below. Furthermore, the central member 24 is designed with a depress to release type locking mechanism 27 that is well-known in the art and allows the user to choose between a plurality of distances. The locking mechanism 27 has projections 28 that oppose each other and are biased outwardly by an internal spring device (not shown) from the second section 26 and ideally into an aperture 29 located in the first section 25, as depicted in FIG. 11. In order to adjust the distance, the user overcomes the spring by depressing the projections 28 inward and then sliding the second section 26 until the projections 28 encounter another aperture 29. In the present design, the side lateral members 17 are not equipped with a locking device and telescope simultaneous to the controlling central lateral member 24. It is foreseen that any one and/or a plurality of the lateral members 17 and 24 could be equipped with locking devices in order to provide the same function as taught herein.

Figure 4:
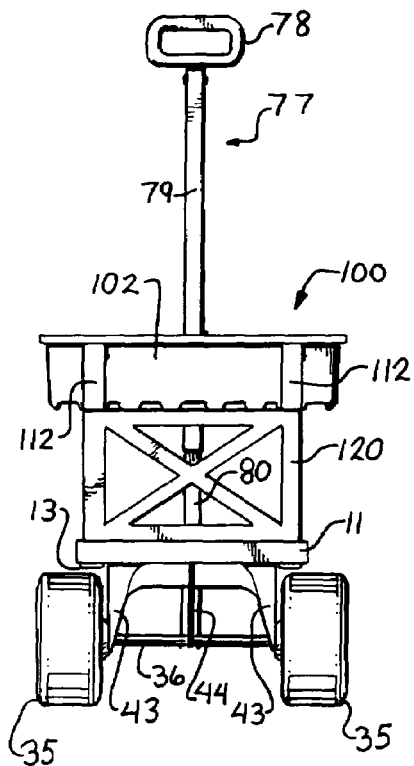
FIG. 4 is a rear elevational view of the cart on a reduced scale illustrating trestles mounted on the frame in order to elevate the bed.
Figure 5:
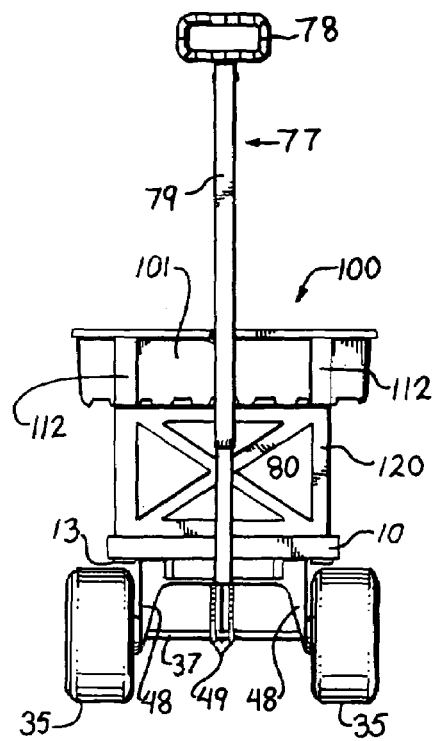
FIG. 5 is a front elevational view of the cart on a reduced scale illustrating the trestles mounted on the frame and bed.
Figure 6:
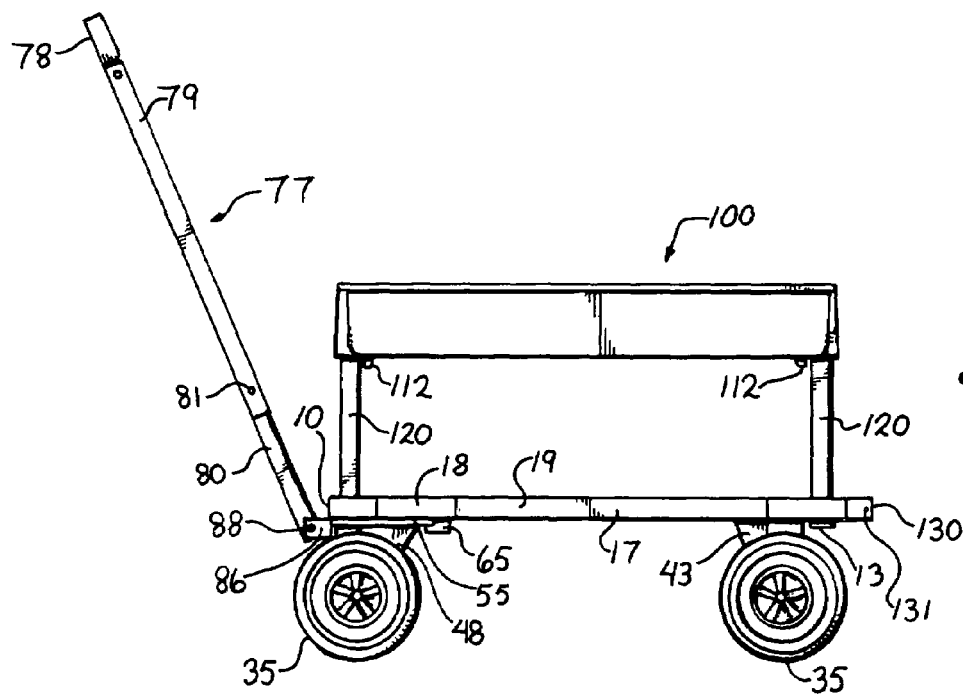
FIG. 6 is a side elevational view of the cart on a reduced scale illustrating the trestles mounted on the frame and bed and further illustrating the support flange and pivot plate.

The frame 5 is supported by front and rear pairs of wheels 35 that are positioned generally below the frame 5 and provide mobility to the cart 1. Each wheel pair 35 is connected by either a front or rear axle 36 or 37 that in turn connects to the frame 5. Specifically, the rear axle 36 connects to outer rear axle supports 43, which are situated on either side of a central rear axle support 44, as depicted in FIG. 4. The supports 43 and 44 are stationary and guide the wheels 35 to rotate in a fixed direction. The front axle 37 are supported, as depicted in FIG. 5, by outer front axle supports 48 situated on either side of a dual central front axle support 49. The supports 48 and 49 are in turn connected to a partially circular pivot plate 55 that allows the supports 48 and 49 and ultimately, the front wheels 35 to pivot from left to right in order to allow the user to steer or direct the cart 1 in a desired direction. The outer supports 48 each have a support engagement surface 50 that will be discussed further below.

FIG. 11 provides an illustration of the pivot plate 55, which is joined to the frame front member 10 by a central bolt 56 that passes through an aperture 57 to connect and secure the plate 55 to an upper track 58 that is built into the frame 5. The track 58 has top and side surfaces 59 and 60 and is designed to fit flush with the plate 55 and coordinate therewith to enable the user to steer the cart 1. When observing the combined plate 55 and track 58 from the side as in FIG. 11, the majority of the plate 55 is contained beneath the track 58 except for a shoulder portion 64, which extends past the track side surface 60.

It is foreseen that the cart 1 may be used to transport heavy loads and as such is equipped with a pivot plate support 65 that in the present embodiment has an L-shape or flange like shape that extends under the plate 55 and is secured to the central member 24 of the frame 5. The support 65 provides support to the shoulder 64 of the plate 55 and has a groove 66 that is sized and shaped to snugly but slidingly fit around the shoulder portion 64 of the plate 55, essentially providing a track to keep the plate from flexing under excessive weight. Furthermore, the support 65 also prevents the plate 55 from pivoting beyond a desired range by acting as a stop. Specifically, the plate 55 can only pivot to a certain extent in either direction due to the fact that the support 65 obstructs further pivoting when it engages the bar engagement surface 50 located on both front axle supports 48.

Because the support 65 is a stress point, it is foreseen that the support 65 may occasionally fail and require replacement. Therefore, the support 65 is designed to be easily sleeved on and fitted around the central member 24 via use of the same type of locking mechanism utilized to telescope the central member 24, as previously discussed. Specifically, the front end of the central member 24 is equipped with a projection 68 that is biased outwardly by an internal spring (not shown). The support 65 has a corresponding aperture 69 that is sized and shaped to receive the projection 68 so that when the user depresses the projection 68, the support 65 can be fitted over the projection 68 to the point where the projection 68 reaches the aperture 69, springs outwardly and locks the support 65 into position.

Figure 1:
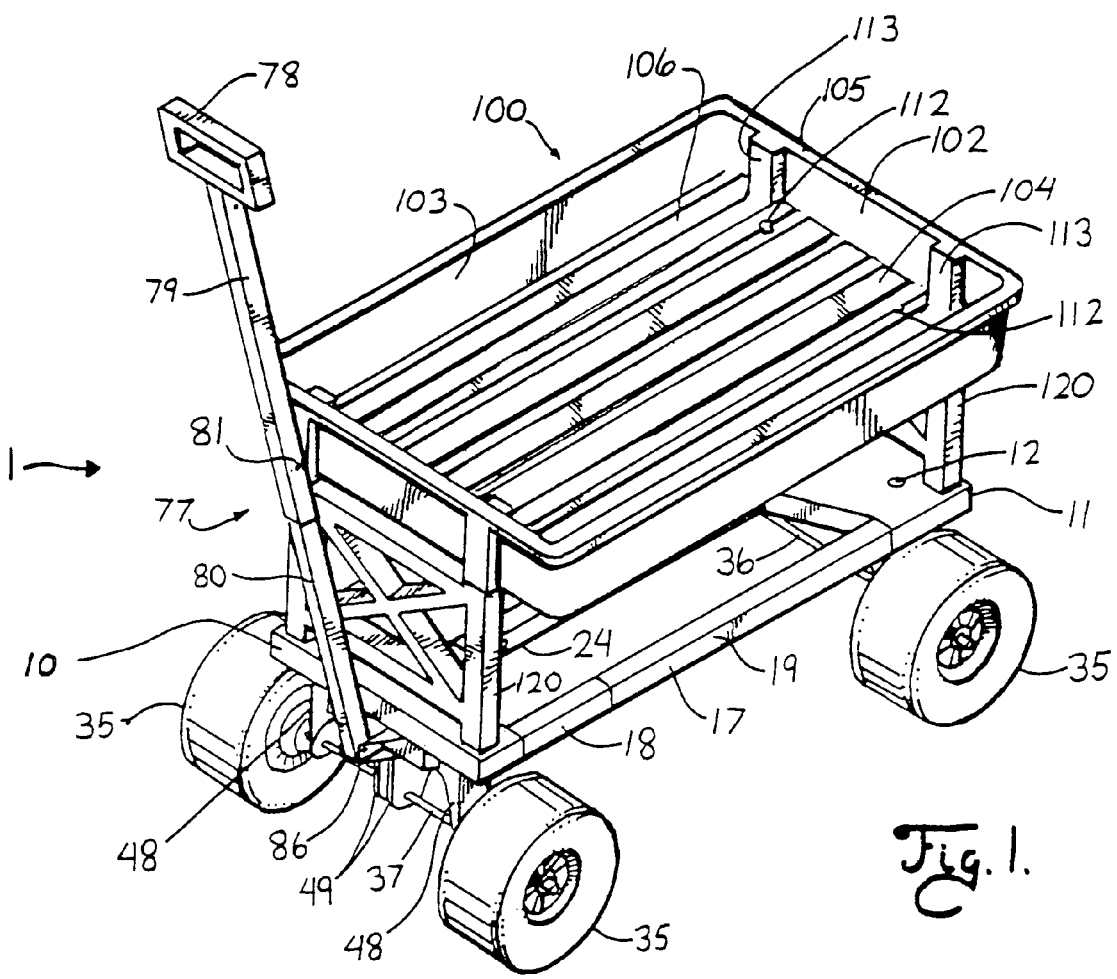
FIG. 1 is a perspective view of an easily adjustable cart in accordance with the present invention with a bed thereof in a raised position.
Figure 3:
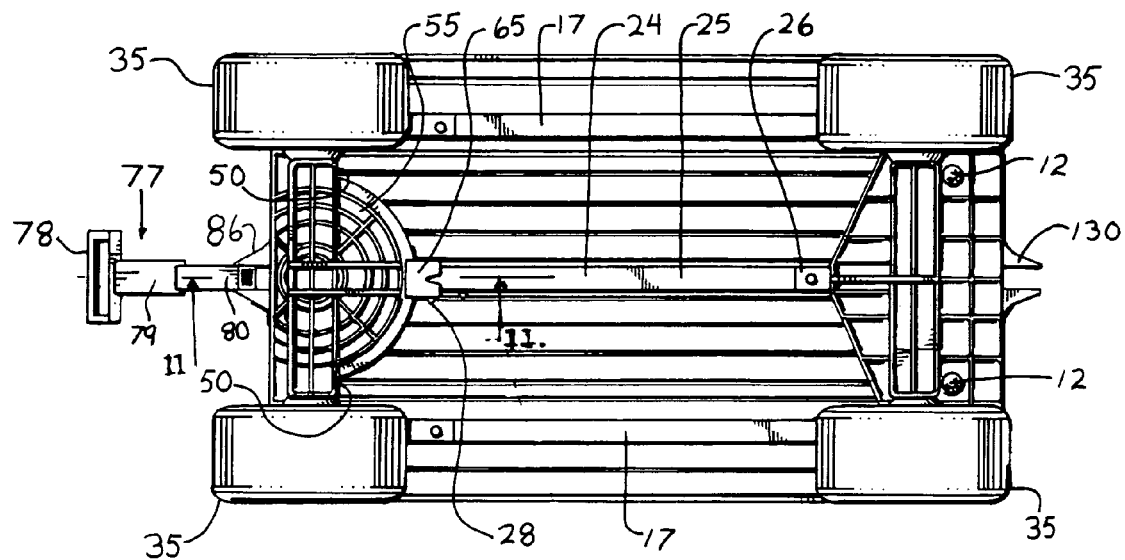
FIG. 3 is an enlarged bottom view of the cart illustrating lateral members thereof with a support flange connected to a central member to provide support to a pivot plate of the steering mechanism.
Figure 2:
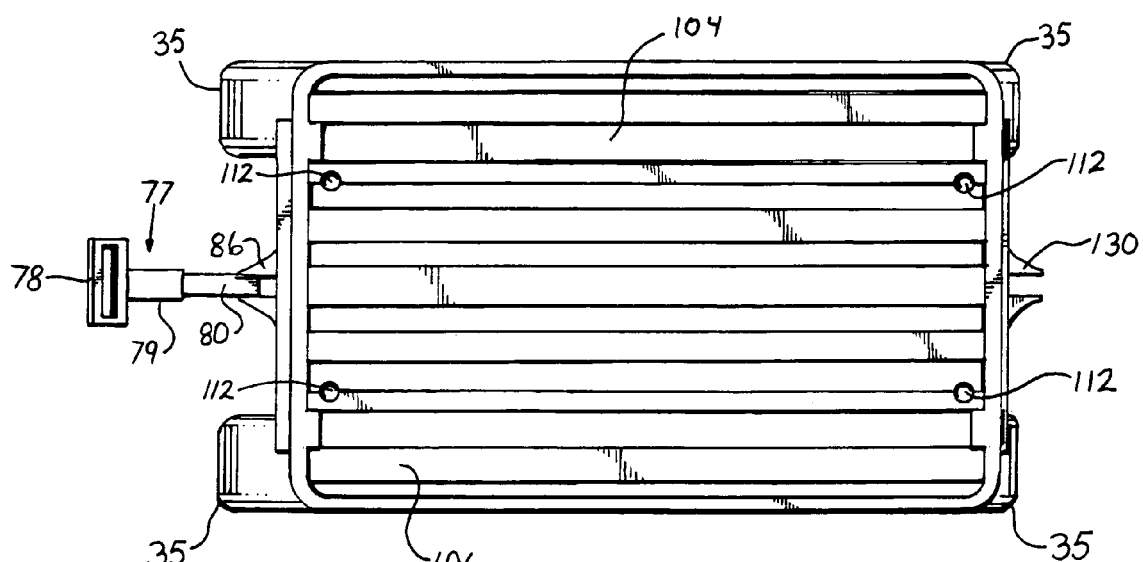
FIG. 2 is an enlarged top plan view of the cart.

The user operates the cart 1 via a telescoping handle 77 that is capable of extending from a storage configuration (not shown) to a use configuration, as depicted in FIG. 1. The user manipulates the handle via a grip 78. The handle 77 has first and second sections 79 and 80 that slidably engage each other with the first section 79 fitting inside of the second section 80. The first section 79 is equipped with a spring-biased locking mechanism, similar to the locking mechanism used with the telescoping frame 5, having a projection 81 that extends into an aperture (not shown) located on the second section 80. While it is foreseen that the handle 77 could employ a number of different locking mechanisms, notably, the present design allows the handle 77 to be locked in a use configuration, as depicted in FIG. 1. In order to retract the handle 77 to the storage configuration (not shown), the user depresses the projection 81 with sufficient force to overcome a spring (not shown), thus allowing the user to slide the sections 79 and 80 together or disassemble the handle 77 altogether.

The handle 77 connects to the frame 5 via a "U" shaped connector 86 that is joined to and functions as an extension of the plate 55. Notably, during a steering maneuver, the handle 77 rotates with the plate 55, thus allowing the plate to distribute the force encountered in rotating over the entire area of the plate 55 in contact with the underside of the frame 5 in order to provide for ease of turning, especially with heavy loads. In order to mount the handle 77 on the connector 86, the lower portion of the first section 79 has an aperture 82 that aligns with corresponding apertures 89 on the connector 86. Upon alignment of the apertures 82 and 89, a bolt 90 is passed through to securely engage the handle 77 to the plate 55 and essentially to the frame 5.

A load-carrying tub or bed 100 having front and rear walls 101 and 102, sides walls 103 and a bottom with a load bearing surface 104 that cooperate to form an enclosure, which is selectively positionable relative to the frame 5. Along the top edge of the walls 101, 102 and 103 is a lip 105 that provides rigidity to the bed 100. It is noted that while the frame 5 is seen in cross-section in FIG. 11, the bed 100 is not. Across the bottom surface 103 are ribs 106 that add rigidity to the bed 100 and form a part of the load supporting surface 104. On the underside of the bottom surface 104 are projections 112 that extend outwardly and are sized and shaped to mate with corresponding receivers 12 located in the frame 5. The present design utilizes projections 112 and receivers 12 of a round shape to facilitate ease of use.

Figure 12:
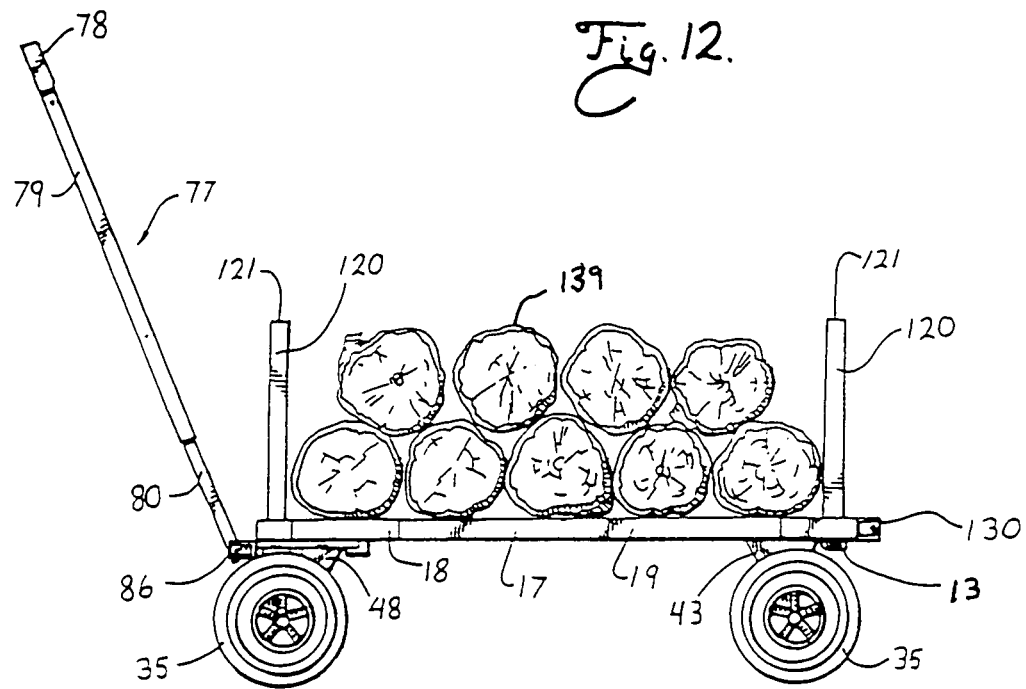
FIG. 12 is a side elevational view of the cart similar to FIG. 6 except that the bed is removed, thus illustrating the trestles engaged with the frame and carrying a load of logs.

The bed 100 also can be elevated by risers or trestles 120 in order to provide additional storage in the area underneath the bed 100 so that loads can be transported both in the bed 100 and directly on the frame 5 and specifically, the elongate frame members 17 and 24 or so that the bed 100 can be raised to facilitate use such as allowing a user to place plants for planting at a convenient raised level. The trestles 120 engage and extend into the bed 100 via the projections 112 being located in the receivers 113 to provide stability. The receivers 113 are located on either end of the bed 100 and are sized and shaped to accommodate the projections 112 on an upper end 121 of each of the trestles 100. The legs 13 at the lower end 122 of the trestles engage and extend into receivers 113 located in the frame 5. It is foreseen that the frame 5 can be extended or retracted with or without trestles 120 to accommodate beds of different shapes and sizes. It is also possible to transport loads, such as legs 139, without the bed 100 in place so that the load 139 rests directly on the frame 5, such as is depicted in FIG. 12.

Figure 13:
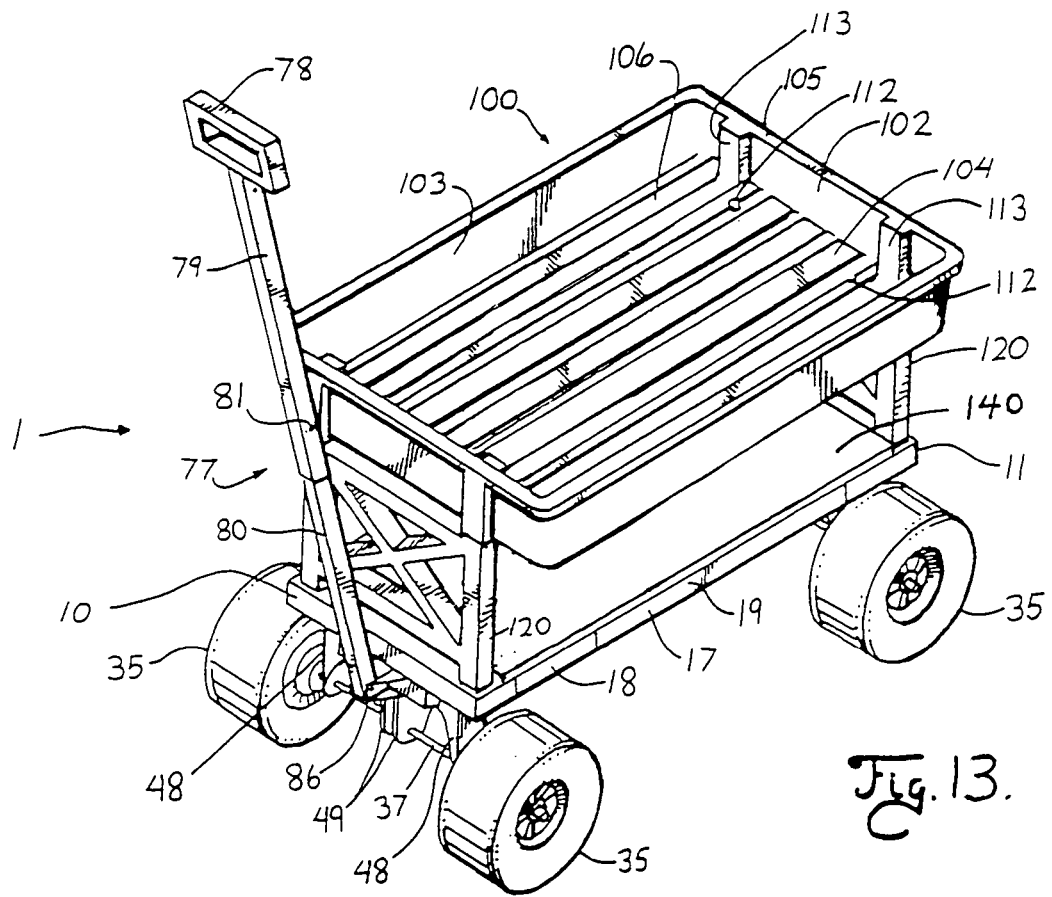
FIG. 13 is a perspective view of the cart similar to FIG. 1 on a reduced scale with a flat platform mounted on the frame beneath the bed.

In an alternative use configuration, the cart 1 includes a generally flat platform 140 that sets on the frame 5 between the trestles 120 and which preferably includes projections similar to the projections 112 on the bed to be received in the receiver 12 for stability. This configuration is shown in FIG. 13 with the platform 140 located below the bed 100, although in some uses the bed 100 may be completely removed, such as in FIG. 12.

The present design also provides a hitch 130 situated at the rear of the cart 1 and is centrally located on the rear member 11. The hitch 130 is "U" shaped and is configured similarly to the handle connector 86 having apertures 131 located on either side of the hitch 130 so that the user can attach additional carts such as the present cart 1 or the like.

It is to be understood that while certain forms of the present invention have been illustrated and described herein, it is not to be limited to the specific forms or arrangement of parts described and shown.

What is claimed and desired to be secured by Letters Patent is:

1. A size variable cart comprising:
   a) a frame with ground engaging wheels; the frame telescoping between a front and a rear of the cart to allow adjustment of the front to rear length thereof;
   b) a rigid bed of integral one piece construction that has a load bearing surface; said bed having first and second configurations with respect to the frame; in the first configuration said bed includes a lower first set of projections that are received in a cooperating first set of receivers on a front and a rear of the frame so as to fix the length of the cart when the bed is positioned directly on the frame in the first configuration;
   c) a set of front and rear trestles that are selectively mountable in spaced relationship to one another in a second set of receivers on a front and a rear of said frame respectively with said bed being thereafter mounted in the second configuration on said trestles so as to span between said trestles and fix the length of the cart when the bed is positioned on the trestles and so as to be supported by said trestles in the second configuration above said frame.

2. The cart according to claim 1 wherein:
   a) said wheels include front and rear wheels with said front wheels being joined to said frame by a steering mechanism including a pivot plate that extends beneath said frame; and
   b) a support member secured to said frame and having a support surface that extends under said pivot plate to slidingly support said pivot plate and prevent bowing under loads.

3. The cart according to claim 2 wherein:
   a) said support member is flange shaped.

4. The cart according to claim 1 wherein:
   a) said frame has front and rear structural units with at least one connecting lateral member telescopingly connecting said units.

5. The cart according to claim 1 wherein:
   a) said bed has front, rear and side walls.

6. The cart according to claim 1 wherein:
   a) said cart has a handle attached to said frame.

7. The cart according to claim 1 including:
   a) a platform having a generally planar upper surface that is sized and shaped to be located on said frame when said bed is in said second position in raised and spaced relationship to said platform.

\* \* \* \* \*